United States Patent [19]

Tholl

[11] Patent Number: 5,409,727
[45] Date of Patent: Apr. 25, 1995

[54] PROCESS FOR THE PRODUCTION OF LOW-CALORIE SPREADS

[75] Inventor: George W. Tholl, Pewee Valley, Ky.

[73] Assignee: United Dominion Industries, Inc., Charlotte, N.C.

[21] Appl. No.: 248,461

[22] Filed: May 24, 1994

Related U.S. Application Data

[63] Continuation of Ser. No. 6,656, Jan. 22, 1993, abandoned.

[51] Int. Cl.$^6$ ............................................. A23D 7/00
[52] U.S. Cl. ..................................... 426/603; 426/601; 426/602
[58] Field of Search ......................... 426/601, 602, 603

[56] References Cited

U.S. PATENT DOCUMENTS

| | | |
|---|---|---|
| Re. 21,406 | 3/1940 | Vogt . |
| 4,087,565 | 5/1978 | Ebskamp ............................ 426/603 |
| 4,177,293 | 12/1979 | Forman et al. . |
| 4,217,372 | 8/1980 | Ebskamp ............................ 426/603 |
| 4,279,658 | 7/1981 | Harvey et al. . |
| 4,568,556 | 2/1986 | McCoy ............................... 426/603 |
| 4,615,892 | 10/1986 | Morehouse et al. . |
| 5,053,241 | 10/1991 | Mongeau ............................ 426/603 |
| 5,096,732 | 3/1992 | Mongeau ............................ 426/603 |
| 5,151,290 | 9/1992 | Norton ............................... 426/603 |
| 5,169,668 | 12/1992 | Milo .................................. 426/602 |
| 5,244,688 | 9/1993 | Norton et al. ..................... 426/602 |

OTHER PUBLICATIONS

Gunstone 1983 Lipids in Foods Chemistry, Biochemistry and Technology Pergamon Press pp. 149–150.
Bailey's Industrial Oil and Fat Products, 3rd Edition, pp. 344–349.
Encyclopedia Of Food Science And Technology, vol. 3, pp. 1643–1644.

*Primary Examiner*—Carolyn Paden
*Attorney, Agent, or Firm*—Fitch, Even, Tabin & Flannery

[57] ABSTRACT

This invention is for a process for producing a water-in-oil emulsion and edible margarine-like spread composition having a fat content of less than 80 percent by weight and having the approximate consistency of margarine, the process comprising forming a liquid dispersion of a water phase and a liquid fat phase of a substantially hard fat and a liquid soft fat, followed by cooling of the dispersion and subjecting the cooled dispersion to a shearing force sufficient to produce a water-in-oil emulsion, and discharging the emulsion to provide a product having the approximate consistency of margarine at room temperature.

19 Claims, No Drawings

PROCESS FOR THE PRODUCTION OF LOW-CALORIE SPREADS

This application is a continuation of application Ser. No. 08/006,656, filed Jan. 22, 1993, now abandoned.

FIELD OF THE INVENTION

The present invention generally relates to the production of comestible spreads and more particularly relates to edible spreads useful as margarine substitutes having reduced caloric content.

BACKGROUND OF THE INVENTION

In recent years considerable attention has been directed to the provision of comestible spreads resembling margarine but having reduced fat and caloric content. By government regulation, a "margarine" product must contain at least 80% fat by weight. Margarines comprise a water phase and an oil phase which are emulsified. Margarines generally are in the form of a water-in-oil emulsion. The taste of margarines and low fat edible spreads is due mostly to water soluble flavors, oil soluble flavors, and salt included in the water phase. The release of the water soluble flavors and salt from the encapsulating oil phase provides to the consumer a burst of flavor customarily associated with these products. The amount of flavor burst the consumer perceives is primarily a function of the droplet size of the encapsulated water phase. A very tight water-in-oil emulsion with a relatively small water phase droplet size yields a small flavor burst while a more loose emulsion with a larger encapsulated water droplet size generally provides a larger flavor burst. In the prior art, low calorie spreads, "functional" ingredients are often added to control droplet size. Thus, proteins from dairy sources, such as whey powder or non-fat dry milk solids, are commonly used to destabilize the emulsion and to counteract the effect of added emulsifying agents to thus increase the droplet size of the water phase and increase the flavor burst.

Moreover, prior art processes for producing low fat edible spreads resembling margarine generally used the same equipment as margarine processes and consisted of multiple scrape-surface heat exchangers and pin-working units as described in *Bailey's Industrial Oil and Fat Product*, 3rd Edition, pp. 344–349. Equipment of this type involves considerable capital expenditure, residence times which are relatively lengthy, and substantial energy and/or operating costs.

It is a principal object of this invention, therefore, to provide improved low calorie spreads closely resembling margarine in appearance, texture and mouthfeel which can be produced in an economical manner.

It is a further object of this invention to produce in a simple manner, low calorie spreads having rheological, textural and flavor release characteristics similar to margarine with considerably reduced fat content from margarine.

SUMMARY OF THE INVENTION

This invention provides a process for producing an edible margarine-like spread composition comprising a water-in-oil emulsion having a fat content of less than about 80% by weight and having the approximate consistency of margarine at room temperature which comprises: (a) forming an edible liquid dispersion including a water phase, and a fat phase comprising a blend of a melted solid or hard fat and a liquid fat, (b) cooling the said liquid dispersion to a temperature sufficient to effect substantial solidification of the hard fat, (c) then subjecting the cooled dispersion to a shearing force sufficient to produce a water-in-oil emulsion, and (d) discharging the water-in-oil emulsion from the action of the shearing force so as to provide an edible water-in-oil emulsion having the approximate consistency of margarine at room temperature.

DESCRIPTION OF THE PREFERRED EMBODIMENTS

The fat components of the dispersion employed to form a spread in accordance With the invention is a blend of a solid or hard fat which has a Wiley Melting Point in the range of about 90° to 120° F., and a liquid fat which has a Wiley Melting Point less than about 32° F. The percentage of hard fat to liquid fat in the blend can be varied widely. As is known, the Solid Fat Index (SFI) is the ratio of hard fat to liquid fat and is a well accepted method used to classify fat mixtures and is Method CD-10-57 of the American Oil Chemists Society. A preferred fat blend typically comprises between about 10 and about 45 weight percent of a hard fat based upon the total weight of fat, the hard fat having an Iodine Value (IV) of about 55 to about 85 and a Wiley Melting Point in the range of 90° to 120° F.; and between about 55 to about 90 weight percent of a liquid fat based upon the total weight of fat, the liquid fat having an Iodine Value of between about 115 to 150 and a Wiley Melting Point less than 32° F.

The fats for the spreads produced by this invention may be formulated from a variety of edible fatty triglycerides such as soybean oil, cottonseed oil, peanut oil, olive oil, palm oil, corn oil, rapeseed oil, sunflower seed oil, sesame oil, safflower oil, sardine oil, lard and tallow, or mixtures thereof. Vegetable oils are preferred over animal oils and oils that quickly solidify are generally preferred over other oils. Soybean oil, either solid or liquid, are particularly preferred fats to provide the hart fat and liquid fat.

According to one preferred embodiment of the invention, a dispersion comprising a water phase and a suitable fat blend is formed at a temperature at which the SFI of the fat blend is zero, that is, the fats are completely in liquid state. Preferably, the water and fat blend dispersion is formed at a temperature of not more than 30° F. above the temperature at which the SFI is zero. The water phase is employed in amounts of from about 25% to 85% by weight of the product and the fat phase comprises 15% to 75% by weight of the product.

Minor amounts of optional ingredients can be included in the water phase of the formulation to achieve a desired flavor and to retard microbiological deterioration of the final product during storage. Typical optional ingredients which can be incorporated in the water phase are:

Salt, NaCl 0.5 to 3.0 wt %
Flavor—water soluble 0.0.1 to 0.03 wt %
Potassium sorbate 0.0005 to 0.002 wt %
EDTA 50 to 100 ppm
Dairy proteins 0 to 0.1 wt %

Also, the fat or oil phase of the formulation can include known oil-soluble flavors in minor amounts such as from 0.1% to 0.2% by weight of the formulation and coloring agents such as beta carotene in an amount of about 0.005% by weight.

An emulsifying agent of known type, such as monoglycerides and lecithin, is employed in the formulation generally in an amount of about 0.25% to 1.0% by weight of the formulation. The emulsifying agent is preferably added to the water and oil mixture but can also be added in slightly higher concentrations to the oil phase.

The dispersion of water and fat blends can be formed by adding them to a blending tank in batchwise manner, or the water and fat blends can, in a continuous process, be separately metered into a blending tank. In any event, the water-fat blend dispersion is then cooled from the initial mixing temperature (usually 120° to 150° F.) to a temperature below the temperature at which the hard fat solidifies; preferably the dispersion is cooled to a temperature in the range of 35° to 45° F. Preferred cooling rates are in the range of 1° F. per second to 8° F. per second.

While various equipment can be employed to cool the water-fat dispersion, it is highly desirable and preferred that a tubular heat exchanger of known type be utilized which produces sufficient flow turbulence to insure that the solidifying fat will not plate out on the surface of the heat exchanger so as to alter the composition of the final product. The cooled dispersion is preferably maintained at the selected temperature for a period to insure that the hard fat (i.e., the high melting fat) is solidified. However, it is not altogether necessary to use this holding step. Thus, holding can be effected from 0 to 5 minutes, but preferably is effected by maintaining the dispersion for a period of 0.5 to 2 minutes in a holding tube connected to the tubular heat exchanger. Average flow velocities through the holding tube commonly range from about 2 feet per second to about 6 feet per second.

After cooling and any holding, and when the hard fat is substantially solidified, the dispersion is subjected to mechanical shearing whereby the dispersion is emulsified to a water-in-oil (w/o) emulsion. The emulsified product, after being subjected to mechanical shearing is preferably held for a tempering period of say 4 to 24 hours in the temperature range of 70° F. to 80° F., is a stable emulsified plastic solid having the consistency of tub margarine at room temperature.

Various known high shear devices for imparting mechanical shear to liquids can be used to form the water-in-oil emulsion, such as, for example, dispersers, shear pumps, emulsifiers, colloid mills, high speed wet mills, jets, high intensity mixers and the like. The shearing device should possess a large mixing volume as compared to the droplet size of the dispersion fed to the shearing device to insure a consistent water-to-oil ratio in the final product and homogenous fluid-fluid interactions between the two phases. The water-to-oil ratio will be determined by the proportion of water phase and oil phase fed into the process.

The mechanical shearing of the dispersion should be conducted for a time and at a rate to reduce the largest consistent dispersed water phase droplet size below 500 microns (0.5 mm) as determined from an optical microscope to ensure that interfacial phenomena hinders the coalescence of the emulsified water droplets under static conditions. Preferably, the droplet size will be less than 400 microns and greater than 100 microns.

Typically, the dispersion fed to the shearing device has a viscosity of between about 5 to about 25 centipoises and the emulsified product has a yielding viscosity of 10,000 to 10,000,000 centipoises where the yielding viscosity is defined as the viscosity at the yielding point of the plastic solid material. It is well known in the literature that as the interfacial surface area between the two phases increases, the yielding viscosity and stress will increase. A decrease in droplet size yields an increase in interfacial surface area, hence as droplet size decreases, the yielding viscosity and stress will increase. This relationship holds for any particular formulation. The yielding stress should be between about 20 Pa and about 950 Pa and preferably between about 60 Pa and about 700 Pa.

During mechanical shearing, the temperature of the materials undergoing shear increases due to frictional/viscous interactions. The temperature rise of the fluids during shearing correlates with the yielding viscosity and yielding stress, and hence with the droplet size of the dispersed water in the emulsified product providing the temperature does not rise above the melting point of a significant fraction of the hard fat. So as to achieve a relatively small droplet size for the water in the emulsified product, the mechanical shearing is conducted so as to limit the temperature rise in the fluid mixture undergoing shear to less than 50° F. Preferably the temperature rise is maintained in the range of from 5° to 20° F.

The following specific examples further illustrate the invention and the advantages thereof.

EXAMPLE 1

A formulation was prepared composed of about 60 weight percent water phase and about 40 weight percent oil phase and contained the following ingredients:

| Water Phase | |
|---|---|
| Water | 58.0 wt % |
| Salt, NaCl | 2.0 wt % |
| Flavor - water soluble imitation butter | 0.02 wt % |
| Potassium sorbate | 0.001 wt % |
| EDTA | 75 ppm |
| Oil Phase | |
| Liquid soybean oil | 29.3 wt % |
| Solid soybean oil | 10.0 wt % |
| Flavor - oil soluble imitation butter | 0.15 wt % |
| Beta carotene | 0.004 wt % |
| Emulsifying agent - distilled monoglycerides (<10% diglycerides) | 0.5 wt % |

The solid soybean oil had a Wiley Melting Point in the range of 102°–108° F., an Iodine Value in the range of 65–73 and a solid fat index (SFI) as follows:

| Solid Soybean Oil | |
|---|---|
| Temperature | SFI |
| 50° F. | 54–58 |
| 70° F. | 40–44 |
| 80° F. | 35–39 |
| 92° F. | 15–19 |
| 104° F. | 4.0 maximum |

A dispersion of the above ingredients was prepared by adding the water phase ingredients to a tank followed by the addition of all oil phase ingredients after which the emulsifying agent was added. The mixture in the blend tank was equilibrated to 120° F. After equilibration, the oil and water dispersion was pumped from the blend tank through tubular heat exchangers in which the dispersion was cooled to 40° F. at a cooling rate of 5° F. per second. The dispersion was passed through a holding tube or cooling section of the exchanger for 30 seconds following which it was introduced into a mechanical shearing device.

The mechanical shearing device consisted of two sets of closely spaced intermeshing pins, with ⅛" clearance, mounted perpendicularly on the face of two circular disks with one rotating with respect to the other where the dispersion enters at the center of the stationary disk and exits at the periphery of the disks. Samples of the cooled dispersion were emulsified in the shearing device at four maximum shear rates of 4500 $s^{-1}$ to 11000 $s^{-1}$ where the maximum shear rate is defined as relative linear velocity of the outer most set of pins divided by the distance between the pins, ⅛". Each of the four samples collected had a residence time in the shearing device of approximately 2 seconds at a flow rate of 2200 lb/hr and the temperature rise in the samples ranged from 2° to 15° F. The sheared emulsified products were packaged in 1 pound tubs, tempered at 75° F. for 12 hours, and finally cooled to refrigeration temperatures. Observations are shown below:

| Sample | Shear Rate $s^{-1}$ | Yielding Stress Pa. | Yielding Viscosity cps. | Temp. Rise °F. | Power Input kW | Drop. Size of Water Phase Microns |
|---|---|---|---|---|---|---|
| 1 | 4,500 | 188 | 1,300,000 | 2 | 2.0 | 350 |
| 2 | 6,600 | 233 | 1,700,000 | 5 | 3.8 | — |
| 3 | 8,900 | 267 | 1,900,000 | 10 | 6.4 | — |
| 4 | 11,000 | 357 | 2,500,000 | 15 | 10.0 | 100 |

The yielding stress and yielding viscosity were measured using a Haake concentric cylinder viscometer with a programmed shear rate acceleration to determine the yield point. The above results show the relationship between the shearing rate and the droplet size of the dispersed water phase. As the shearing rate was increased, the yielding stress and yielding viscosity of the samples increased, as did the temperature rise in the samples undergoing shear. The lower shear rate resulted in a smaller rise in temperature, thus indicating a larger droplet size for the dispersed water phase of the water-in-oil emulsion. At shearing rates less than 4500 $s^{-1}$, the emulsion separated into its respective phases immediately. Further, visual inspection using a light microscope at 450 power and a measuring reticle in increments of 50 microns (0.05) of sample 1 taken at 4500 $s^{-1}$ yielded the largest consistent droplet size at approximately 350 microns (0.35 mm). Sample 4 was taken at 11,000 $s^{-1}$ showed a similar measurement at a value of 100 microns (0.1 mm).

Similar rheological results for a commercially available low fat spread product having 48% vegetable oil where the yielding stress was measured as 293 Pa and where the yielding viscosity was measured as 2,350,000 cps at 75° F. Visual inspection of this commercial product yielded the largest consistent droplet size at approximately 100 microns (0.1 mm).

The power input measurements indicated show the total energy input by the shearing device for the production of 2,200 lb/hr. Based on prior art operating data, the power requirement for a prior at process at the same production rate would be approximately 20 kW. Hence, the process of this invention provides a substantial reduction in energy usage.

In comparing the flavor bursts between the samples collected, a perceptible difference was apparent with a smaller flavor burst resulting as the maximum shear rate was increased. The textural and flavor characteristics of the samples were deemed similar to products commercially available.

EXAMPLE 2

A formulation was prepared composed of 40 weight percent water phase and 60 weight percent oil phase and containing the following ingredients:

| Water Phase | | |
|---|---|---|
| Water | 38.0 | wt % |
| Salt, NaCl | 2.0 | wt % |
| Flavor - water soluble Imitation butter | 0.02 | wt % |
| Potassium sorbate | 0.001 | wt % |
| EDTA | 75 | ppm |
| Oil Phase | | |
| Liquid soybean oil | 47.3 | wt % |
| Solid soybean oil | 12.0 | wt % |
| Flavor - oil soluble Imitation butter | 0.15 | wt % |
| Beta carotene | 0.004 | wt % |
| Emulsifying agent - distilled monoglycerides (<10% diglycerides) | 0.5 | wt % |

The solid soybean oil was the same as described in Example 1. A dispersion of the ingredients was prepared as in Example 1 and equilibrated to 120° F. and then cooled to 45° F. at a cooling rate of 5° F. per second. The dispersion was held in a holding tube or cooling section of the heat exchanger for 30 seconds before being introduced into the mechanical shear device described in Example 1. Samples of the cooled dispersion were emulsified in the mechanical shear device at five maximum shear rates from 2100 $s^{-1}$ to 11,000 $s^{-1}$. The five samples had a residence time in the shearing device of approximately 2 seconds at 2200 lb/hr and the temperature rise in the samples range from 1° to 17° F. The sheared emulsified samples were handled as in Example 1. Observations are shown below:

| Sample | Shear Rate $s^{-1}$ | Yielding Stress Pa. | Yielding Viscosity cps. | Temp. Rise °F. | Power Input kW |
|---|---|---|---|---|---|
| 5 | 2,100 | 61 | 440,000 | 1 | 0.8 |
| 6 | 4,500 | 64 | 450,000 | 3 | 2.0 |
| 7 | 6,600 | 83 | 590,000 | 6 | 3.5 |
| 8 | 8,900 | 93 | 660,000 | 11 | 5.7 |
| 9 | 11,000 | 100 | 710,000 | 17 | 9.0 |

Comparison of the rheological measurements in Example 1 and Example 2 shows that as the percentage of water in the formulation decreased the yielding stress and yielding viscosity of the products decreased. With less water in the formulation, softer water-in-oil emulsion is obtained even with an increase in the concentration of the hard soybean oil.

These samples were judged to be similar to commercially available margarine-like products.

EXAMPLE 3

A formulation was prepared composed of 80 weight percent water phase and 20 weight percent oil phase and contained the following ingredients:

| Water Phase | |
|---|---|
| Water | 78.0 wt % |
| Salt, NaCl | 2.0 wt % |
| Flavor - water soluble Imitation butter | 0.02 wt % |
| Potassium sorbate | 0.001 wt % |
| EDTA | 75 ppm |
| Oil Phase | |
| Liquid soybean oil | 12.8 wt % |
| Solid soybean oil | 16.5 wt % |
| Flavor - oil soluble Imitation butter | 0.15 wt % |
| Beta carotene | 0.004 wt % |
| Emulsifying agent - distilled monoglycerides (<10% diglycerides) | 0.5 wt % |

The solid soybean oil was the same as specified in Example 1. A dispersion of the ingredients was prepared as in Examples 1 and 2 and equilibrated to 30° F. and then cooled to 40° F. at a cooling rate of 6° F. per second. The dispersion was held in a holding tube or cooling section of the heat exchanger for 30 seconds before being introduced to the mechanical shear device described in Example 1. Samples of the cooled dispersion were emulsified in the mechanical shear in a range of maximum shear rates from 5,550 $s^{-1}$ to 11,000 $s^{-1}$. The samples had a residence time in the shearing device of approximately 2 seconds at 2200 lb/hr and the temperature rise in the samples range from 2° to 14° F. The sheared emulsified samples were handled as in Example 1. Observations are shown below:

| Sample | Shear Rate $s^{-1}$ | Yielding Stress Pa. | Yielding Viscosity cps. | Temp. Rise °F. | Power Input kW |
|---|---|---|---|---|---|
| 10 | 5,500 | 514 | 4,100,000 | 2 | 2.4 |
| 11 | 6,600 | 558 | 4,500,000 | 4 | 3.4 |
| 12 | 8,900 | 608 | 4,900,000 | 9 | 6.3 |
| 13 | 11,000 | 635 | 5,100,000 | 14 | 10.7 |

These samples were viewed as comparable to diet spread products commercially available.

Accordingly, the process of the invention provides a process for making a comestible spread which can be practiced with low capital requirements and substantially reduced power requirements, while providing competitive products to those commercially available.

The various features of the invention which are believed to be new are set forth in the following claims.

What is claimed is:

1. A process for producing an edible margarine-like spread composition which is a water-in-oil emulsion having a fat content of about 15 to 75 percent by weight and having the approximate consistency of margarine at room temperature, and which is essentially free of gelling agents, said process comprising:
   (a) forming a liquid dispersion containing about 25 to 85 percent by weight of a water phase and about 15 to 75 percent by weight of a liquid fat phase comprising a mixture of a substantially hard fat and a liquid soft fat wherein the ratio of hard fat to liquid soft fat is between about 0.1 to about 0.8, said liquid dispersion being essentially free of gelling agents,
   (b) cooling the liquid dispersion in a heat exchanger to a temperature sufficient to effect substantially complete solidification of the hard fat, wherein the heat exchanger provides sufficient flow turbulence so that the solidifying hard fat does not appreciably plate out within the heat exchanger,
   (c) subjecting the cooled dispersion to a shearing force sufficient in a high shear device for a time effective to produce a water-in-oil emulsion wherein the maximum droplet size of the dispersed water phase is less than 500 microns, and
   (d) discharging the water-in-oil emulsion to provide an edible margarine-like spread composition having a fat content of about 15 to 75 percent by weight and having the approximate consistency of margarine at room temperature, which composition is essentially free of gelling agents.

2. A process in accord with claim 1 wherein the water phase comprises between about 25% and about 85% of the weight of the liquid dispersion and the fat phase comprises between about 15% and about 75% of the weight of the liquid dispersion and wherein the heat exchanger is a tubular heat exchanger.

3. A process in accord with claim 2 wherein the hard fat has an Iodine Value between about 55 and about 85 and a Wiley Melting Point between about 90° and 120° F. and the soft fat has an Iodine Value between about 115 and about 150 and a Wiley melting point of less than 32° F.

4. A process in accord with claim 1 wherein the liquid dispersion is heated to a point where the Solid Fat Index of the hard fat is zero.

5. A process in accord with claim 4 wherein the heating is up to 30° F. beyond the temperature at which the Solid Fat Index of the hard fat is zero.

6. A process in accord with claim 1 wherein the liquid dispersion is cooled to a temperature between about 35° and 45° F. at a rate of between about 1° F. and 8° F. per second.

7. A process in accord with claim 1 wherein the cooled dispersion is held for a period of 0 to 5 minutes before subjecting to shearing forces.

8. A process in accord with claim 7 wherein the period is between about 0.5 to about 2 minutes.

9. A process in accord with claim 1 wherein the droplet size of the water phase is between about 400 microns and about 100 microns.

10. A process in accord with claim 1 wherein the discharged emulsion is tempered.

11. A process in accord with claim 10 wherein the discharged emulsion is tempered at a temperature between about 70° F. and about 80° F. for between about 4 hours and about 24 hours.

12. A process in accord with claim 1 wherein the shearing forces are sufficient to provide the water-in-oil emulsion with a yielding viscosity between about 10,000 cps and about 10,000,000 cps and a yielding stress between about 20 and about 950 Pa.

13. A process in accord with claim 1 wherein the liquid dispersion has a viscosity between about 5 cps and about 25 cps.

14. A process in accord with claim 1 wherein the cooled dispersion is cooled to between about 35° F. and 45° F. and passed through a holding tube at a rate of between about two feet per second and about six feet per second before being subjected to the shearing force.

15. A process as accord with claim 1 wherein the temperature rise during emulsion formation is less than 50° F. and wherein the time the cooled dispersion is subjected to the shearing force is on the order of about two seconds.

16. A process as accord with claim 1 wherein the temperature rise during emulsion formation is less than 20° F. and wherein the time the cooled dispersion is subjected to the shearing force is on the order of about two seconds.

17. A process for producing an edible margarine-like spread composition which is a water-in-oil emulsion having a fat content of about 15 to 75 percent by weight and having the approximate consistency of margarine at room temperature, said process which comprises:
(a) forming a liquid dispersion by heating a mixture consisting essentially of about 25 to about 85 weight percent of a water phase and about 15 to about 75 weight percent of a liquid fat phase, wherein the liquid fat phase contains a substantially hard fat and a soft fat with a ratio of hard fat to soft fat of between about 0.1 to about 0.8 and wherein the mixture is heated to a temperature such that the Solid Fat Index of the hard fat is zero,
(b) cooling the liquid dispersion in a tubular heat exchanger to a temperature sufficient to effect substantially complete solidification of the hard fat, wherein the tubular heat exchanger provides sufficient flow turbulence so that the solidifying hard fat does not appreciably plate out on the heat-exchanging surfaces of the tubular heat exchanger,
(c) subjecting the cooled dispersion to a high shear force sufficient to produce a water-in-oil emulsion, wherein the maximum droplet size of the dispersed water phase is less than 500 microns, and
(d) discharging the water-in-oil emulsion to provide the edible margarine-like spread composition having a fat content of about 15 to 75 percent by weight and having the approximate consistency of margarine at room temperature.

18. A process in accord with claim 17 wherein the hard fat has an Iodine Value between about 55 and about 85 and a Wiley Melting Point between about 90° and 120° F. and the soft fat has an Iodine Value between about 115 and about 150 and a Wiley Melting Point of less than 32° F. and wherein the relatively short time the cooled dispersion is subjected to the high shear force is on the order of about two seconds.

19. A process in accord with claim 18 wherein the cooled dispersion is cooled to between about 35° F. and about 45° F. and held for a period of 0 to about 5 minutes before being subjected to the shearing forces and wherein the discharged emulsion is tempered at a temperature between about 70° F., and about 80° F. for about 4 to about 24 hours.

* * * * *